A. W. LISSAUER.
AIR HUMIDIFIER.
APPLICATION FILED DEC. 22, 1917.
1,377,594. Patented May 10, 1921.
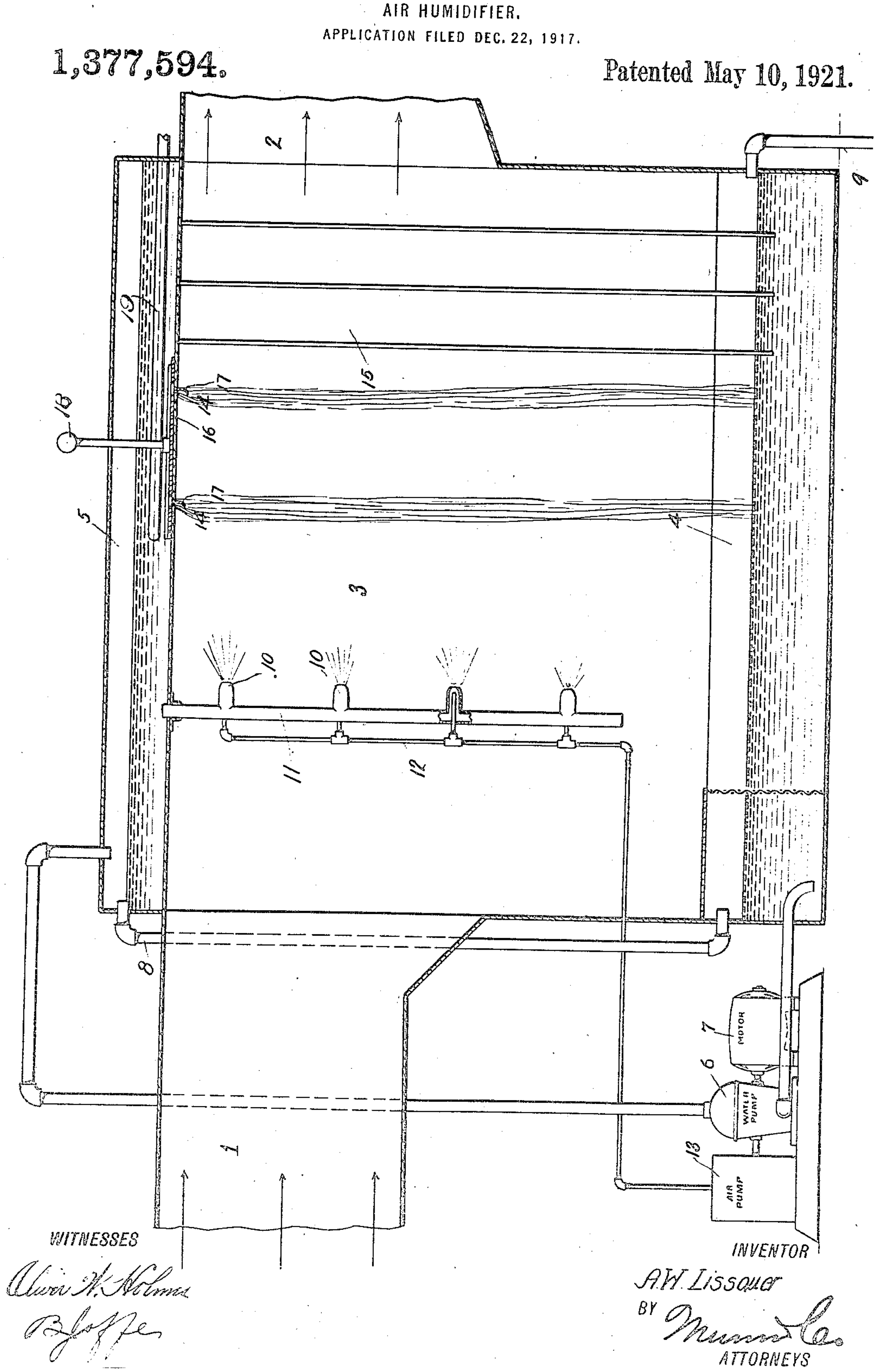
WITNESSES
Olive W. Holmes
B. Joffe
INVENTOR
A.W. Lissauer
BY Munn & Co.
ATTORNEYS

UNITED STATES PATENT OFFICE.

ADOLPH W. LISSAUER, OF NEW YORK, N. Y.

AIR-HUMIDIFIER.

1,377,594. Specification of Letters Patent. Patented May 10, 1921.

Application filed December 22, 1917. Serial No. 208,469.

*To all whom it may concern:*

Be it known that I, Adolph W. Lissauer, a citizen of the United States, and a resident of the city of New York, borough of Manhattan, in the county and State of New York, have invented a new and Improved Air-Humidifier, of which the following is a full, clear, and exact description.

My invention relates to air humidifiers in which a water mist is created to humidify and clean the air forced therethrough. The object thereof is to provide a simple, inexpensive and efficient humidifier characterized by the provision of a tank above the humidifier from which the water to be formed into mist is conveyed gravitationally, and which water is atomized by means of an air current supplied to said gravitationally fed water.

In the accompanying drawing, forming part of the application, the figure represents a diagrammatic sectional view through a humidifier embodying my invention.

Referring to the drawings, 1 is the inlet air conduit spaced from the outlet air conduit 2 by a chamber 3 which has a portion extending below said conduits and forming at the bottom a sump 4. A tank 5 is provided above the chamber 3. Water is supplied to the tank 5 from the sump 4 by a water pump 6 driven from a suitable motor 7. The tank 5 has an overflow 8 leading to the sump, which, in turn, has an overflow 9, so that proper levels of water may be maintained in both the tank 5 and the sump 4.

A series of nozzles 10 are provided within the chamber 3 in the path of the air current. The nozzles 10 are supplied with water from a conduit 11 extending into the chamber from the tank 5. In other words, the water is fed gravitationally to the nozzles 10. To break up the water so fed to the nozzles into a mist, air is supplied to each nozzle from a conduit 12 leading to an air pump 13.

The tank 5 has also an outlet or outlets 14 into the chamber 3, these outlets being formed in the bottom of the tank, that is, the top of the chamber 3, and between the nozzles and separators 15 provided in the chamber in proximity to the outlet air conduit 2. The purpose of the separators is to eliminate the water mechanically carried away by the air in its movement to the separators from the nozzles, and also to eliminate any dust that may be carried by the air. The outlet openings 14 may be varied in size by means of a slide 16, so that the quantity of water falling from the tank directly into the chamber may be varied thereby. The slide 16 is provided with a handle 18 for manipulating the slide. Preferably baffles 17 are provided at the outlets 14 to prevent the moving air from deflecting and breaking up the flow of water at the discharge openings 14 and forcing it toward the outlet air conduit 2. A heating coil 19 is provided in the tank 5 to control the temperature of water in the tank. This water is used for the purpose of heating the air passing therethrough; and by varying the quantity of water flowing through the outlets 14 from the tank 5, the temperature of the air passing therethrough may be regulated.

By providing a tank above the humidifier, I am able to use a rotary water pump, as the lift is comparatively small and no great resistance is offered to the flow, as would be the case if the water were supplied directly to the nozzles to be atomized by the small opening offered to the outflowing water, as is common in apparatus of this class. In other words, by providing a gravitational water flow to the nozzles I can use a pump which will require little energy to operate it. The energy that the air pump will use for breaking up the gravitationally-fed water will be considerably less than that which would be necessary to drive a pump for breaking up the water into a mist directly. Furthermore, the breaking up of the gravitationally-fed water by air permits me to introduce air into the water to be broken up, which will have a tendency to expand and thereby increase the disintegration of the water and give a better saturation of the air passing through the humidifying chamber 3. Furthermore, the air used for breaking up the atomized water tends to diffuse in the body of air forced through the humidifier and transmit the water it carries to the air with which it comes in contact and during its diffusion.

By using air for atomizing the water a very fine mist is obtained, and since absorption of the moisture in the air is inversely proportional to the size of the drops, the efficiency of the humidifier is in direct proportion to the mist created.

By supplying water through the openings 14 in the tank, additional heat is supplied to the air so as to increase the absorption power of the passing air without supplying that heat to the atomized moisture by means of the air which atomizes it. In other words, to reduce the amount of air which would be necessary to atomize and raise the temperature of the water supplied in the form of mist I supply only enough air to atomize the water and supply the additional heat necessary by means of the heated water discharged from the tank 5 in the path of the air in which the mist is formed. This heated water passing through the outlet 14 may be falling in the form of a spray or a thin sheet.

By using air for atomizing the gravitationally fed water I can use nozzles of comparatively large outlet and, therefore, limit the danger of clogging the nozzles. The air can also be used for blowing out the nozzles periodically, if so desired, to insure a clear and unobstructed outlet from the nozzles.

I claim:

1. An air humidifier comprising, in combination, an air chamber through which an air current can be created, a sump in the bottom of said chamber, a tank in the top of said chamber, water spray-forming means in the path of the air current supplied from the tank, and a separator in said chamber for eliminating excess of moisture supplied to the air, said tank having means for supplying water to the chamber between the spray-forming means and the separator.

2. An air humidifier comprising, in combination, an air chamber through which an air current can be created, a sump in the bottom of the chamber, a tank on the top of the chamber, means for supplying water from the sump to the tank, a conduit from the tank into the chamber, nozzles on said conduit, means for supplying air to the nozzles to break up the water supplied thereto from the conduit, a separator for eliminating excess of moisture supplied to the air, said tank having means for supplying water to the chamber between the nozzles and the separator.

3. An air humidifier comprising, in combination, an air chamber through which an air current can be created, a tank at the top of said chamber, water spray-forming means in the path of the air current, said spray forming means being supplied from the tank, and a separator in said chamber for eliminating excess of moisture supplied to the air, said tank having means in the bottom for delivering water to the chamber between the spray-forming means and the separator.

4. An air humidifier comprising in combination an air chamber through which an air current can be created, means for supplying to the air current a water mist, a separator, and means for supplying water in a less divided condition to the current of air and mist, at a temperature of the water mist, said water being supplied in a direction transversely of the air current and mist.

5. An air humidifier comprising in combination an air chamber through which an air current can be created, means for supplying to the air current a water mist, a separator, and means for supplying water in a less divided condition to the current of air and mist in a direction substantially at right angles to the air current, said water supply being of a temperature substantially that of the water mist.

ADOLPH W. LISSAUER.